UNITED STATES PATENT OFFICE.

JOHANN FRIEDRICH MEYER, JR., LUDWIG ROSELIUS, AND KARL WIMMER, OF BREMEN, GERMANY.

TREATMENT OF COFFEE.

No. 897,763.　　　　Specification of Letters Patent.　　　Patented Sept. 1, 1908.

Application filed May 4, 1906. Serial No. 315,181. (Specimens.)

*To all whom it may concern:*

Be it known that we, JOHANN FRIEDRICH MEYER, Jr., LUDWIG ROSELIUS, and KARL WIMMER, subjects of the German Emperor, residing at Bremen, Germany, have invented certain new and useful Improvements Relating to the Preparation or Treatment of Coffee, of which the following is a specification.

This invention relates to a process for treating coffee and the object thereof is to provide a process in a manner as hereinafter set forth for extracting caffein from crude and unbroken green coffee beans, without materially impairing the aromatic constituents of the coffee.

Attempts heretofore made for extracting from green unbroken beans caffein, without injuring the bean in other respects, have not been successful, chiefly because the extracting medium removes from the coffee not only the caffein, but also other aromatic constituents, some of which are valuable, and because it has not been found practicable to dry the wet and swollen up bean in such a manner as to neither affect its appearance nor to render it unsalable for roasting. The foregoing objections are overcome by a process in accordance with this invention, in which the extraction of the caffein, the restoration to the coffee of the valuable constituents dissolved along with the caffein and the drying of the coffee takes place *in vacuo*.

The crude and unbroken green coffee beans are first placed in a vacuum apparatus, after which the extracting medium, such as water, a volatile solvent, acid or an alkali solution is supplied to the apparatus. The vacuum is then broken in order to facilitate the penetration of the extracting liquid into the cells of the beans, after which the vacuum is again established and the green beans subjected to extraction whereby the green beans are deprived of caffein and the other constituents, such as the aromatic oils and fatty substances removed. When the extraction is completed the solution containing the caffein and other constituents is removed, the beans still remaining under a vacuum. The solution is then treated in a known manner so as to deprive it of caffein. The green beans are then subjected to the solution containing all the valuable constituents with the exception of the caffein. By such steps the beans are impregnated with the said constituents, the beans remaining under vacuum during this step, but during said impregnation step the beans are stirred. After the solution has been uniformly distributed over the beans the vacuum is interrupted for a short time in order to facilitate the penetration of the solution into the cells, after which the vacuum is reëstablished and the green beans are dried at a moderate temperature.

As more specifically setting forth a process of treating green coffee beans, reference is had to the following example:—10 kilograms of crude and unbroken green coffee beans are placed in a vacuum pan, water is then admitted until the beans are well covered with it, the vacuum is interrupted for about 5 to 10 minutes, then restored and the beans subjected to extraction for from two to three hours at about 40 to 50° C. The extract thus obtained is treated with a minute quantity of ammonia in order to decompose the salts of caffein, after which the free caffein is washed out with chloroform or benzene. When the chloroform adhering to the residue has evaporated, the residue is dissolved in about 1 liter of water. Th beans after the solution containing the extract has been withdrawn are still *in vacuo*. While the beans are in this state the solution is added thereto and the beans are moistened while remaining *in vacuo* and at the same time stirred. After the solution has been uniformly distributed over the green beans, the vacuum is interrupted for a short time in order to facilitate the impregnation of the aromatic constituents in the beans, after which the vacuum is reëstablished and the green unaltered beans dried at a moderate temperature.

The foregoing process offers the following advantages:—Owing to the use of a vacuum the coffee may be treated throughout the process at a low temperature, the extracting medium penetrates easily into the thickest walled cells and the whole of the constituents of the coffee with the exception of caffein are retained without any material alteration owing to the fact that during the concentration of the extract at a low temperature the distilled aromatic substances remain in the extract and any change of the sugar is avoided. The impregnation with the solution reaches the innermost cells, and the rapid drying at a low temperature prevents the beans from shrinking and becoming black, but more particularly the process is such that it does not injuriously affect the taste of the coffee.

What we claim is:—

1. In a process for obtaining green unbroken coffee beans freed of caffein, subjecting the unbroken green coffee beans to extraction *in vacuo*, removing the extract, depriving the extract of caffein, re-dissolving the residue and restoring it to the green beans while *in vacuo*, interrupting the vacuum for a short period and then restoring the vacuum, and then drying the impregnated green beans *in vacuo*.

2. In a process for obtaining green unbroken coffee beans freed of caffein, subjecting the green beans to extraction *in vacuo*, drawing off the liquid extract, removing the caffein from said extract, and then adding to the beans while *in vacuo* the said extract freed of caffein whereby the green beans are impregnated with said extract.

3. In a process for obtaining green unbroken coffee beans freed of caffein, subjecting the green beans to extraction *in vacuo*, drawing off the liquid extract, removing the caffein from said extract, then adding to the beans while *in vacuo* the said extract freed of caffein whereby the green beans are impregnated with said extract, and then drying the impregnated beans *in vacuo* at a moderate temperature.

In testimony whereof we have set our hands hereunto in presence of two subscribing witnesses.

JOHANN FRIEDRICH MEYER, JR.
LUDWIG ROSELIUS.
KARL WIMMER.

Witnesses:
  C. DIEDRICH,
  F. HOYERMANN.